Figure 1:
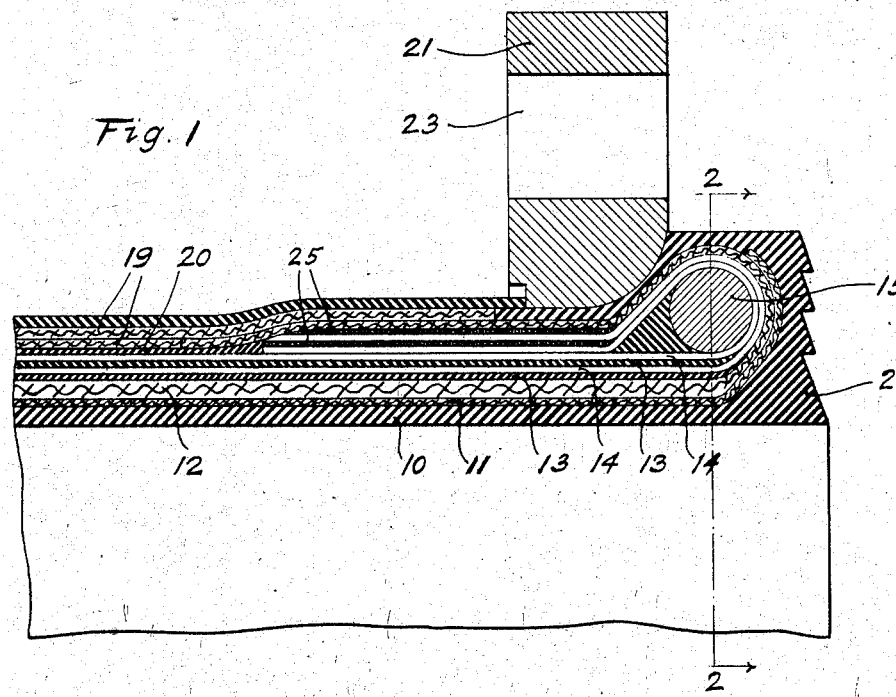

Oct. 13, 1942.  D. E. HARPFER  2,298,736

FLANGED HOSE

Filed Aug. 3, 1940

Inventor
Donald E. Harpfer

By  R H Waters
Attorney

UNITED STATES PATENT OFFICE 2,298,736

FLANGED HOSE

Donald E. Harpfer, Akron, Ohio, assignor to Wingfoot Corporation, Wilmington, Del., a corporation of Delaware Application August 3, 1940, Serial No. 350,432

3 Claims. (Cl. 285—71)

This invention relates to high-pressure hose made of rubber and fabric, and particularly to the construction of the ends of such hose which are to be connected to another hose or conduit or the like.

One object of this invention is to provide in a hose of this character a coupling which will not break down under the high pressures used in such hose, and which will not cause a lessening of the clamping pressure after the hose has been coupled to another hose, whereby to prevent leakage.

Another object of this invention is to provide a clamping flange of metal or similar rigid material which is preferably formed as an integral part of the hose itself and is bonded thereto to prevent spreading of the rubber when the clamping pressure is exerted on the clamping flange.

Another object of this invention is to provide a split ring in the flanged end of the hose with a body of cushioning material between the sections thereof whereby when the clamping pressure is exerted the ring will contract and the cushioning material will exert a force in a direction opposite to the clamping pressure to maintain a tight seal between the hose sections.

Another object of this invention is to provide a reinforcing ring in the end of a hose section which will facilitate the assembly of the ring on the hose during the manufacture thereof.

Figure 2:
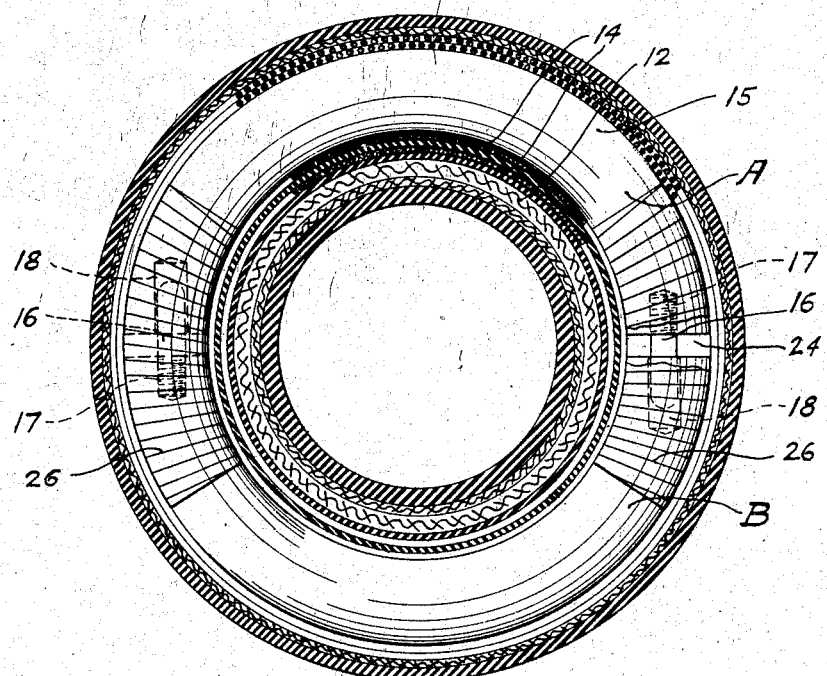

In the drawing:

Fig. 1 represents a longitudinal fragmentary cross-section through a hose embodying my invention; and Fig. 2 is a transverse cross-section taken along the line 2—2 of Fig. 1.

In building a hose of the character described, a tubular mandrel is used such as is commonly employed for this purpose. On the outer surface of this mandrel there is formed a layer of rubber 10 and on top of this there is wound a layer of rubberized fabric 11, preferably breaker stock. On top of this layer 11 is one or more layers of fabric 12, preferably of cross-woven fabric, and on this layer is superimposed alternate layers of rubber 13 and longitudinally extending wires 14. Spirally wrapped layers of wire 25 are used to hold the ends of the wires 14 in place with sufficient rubber around all of said wires to fill the interstices therebetween.

All of this is formed as a straight tubular piece of stock with the wires and fabric extending appreciably beyond the end of the inner rubber layer 10. A split ring 15 is thereafter made to encircle the hose so constructed, near the end thereof, as illustrated in Fig. 1. This ring which is circular in cross-section and substantially annular in general shape, is split substantially on a diameter thereof to form two sections indicated in Fig. 2 as sections A and B. Each section is provided with a pin 16 threaded into the split ring at 17, and the end of each of these pins is rounded so as to more readily enter a bore 18 in the opposed end of the other section of the ring. The pin 16 sliding in the bore 18 permits the ring to contract or expand within the limits of the pins 16. The two sections of the ring are placed over the end of the hose and brought together with the pins 16 arranged within the bores 18 after the preliminary steps of building the hose previously described. In this manner a snug fit can be insured about the hose section without the necessity of removing the hose section from the mandrel and without requiring the ring to be forced over the end of the mandrel since this latter method is sometimes inconvenient, due to the mandrel being supported at its ends and, in the case of a solid ring, this latter operation is rather laborious in view of the fact that if the inner diameter of the solid ring is made to just fit the outer surface of the hose it cannot be readily slipped over the end of the hose without considerable pressure.

The ring is wrapped with gummed fabric or the like at least over the joint between the rings to prevent rubber from flowing into the space between the rings, thus leaving a void 24 which permits the ring to expand and contract. When the ring is in place, the wires 13 and the fabric layers 10, 11 and 14 are turned upwardly and over the ring, and then back against the body of the hose, as is clearly illustrated in Fig. 1.

In order to finish the outer surface of the hose I can then place additional layers of fabric 19 and rubber 20 to protect the outer surface of the hose.

Prior to assembling the hose in the manner set forth, a solid annular clamping ring 21 is slipped over the hose and when the hose is assembled, as has already been described, this ring is moved to the position shown in Fig. 1, preferably before the layer 20 is applied, and a sufficient quantity of rubber is placed around the end of the hose, as at 22, to form the resilient rubber end on the hose during the molding operation, which is employed to bond the layers of rubber, fabric and wire together and to give the hose end its eventual shape. During this molding operation the ring 21 becomes bonded to the outer layer of rubber or rubberized fabric forming the outer layer of the hose to prevent the creeping of the rubber or fabric outwardly or around the ring 15 when the clamping pressure is exerted thereon.

The wires 14 are braided wire, or if desired can be made of relatively stiff material and of such character as to be substantially inextensible, whereby after the hose is once formed and the clamping pressure is exerted on the hose the wire and the adjacent layers of fabric and rubber will not tend to creep around the ring 15 to cause a destruction of the hose structure or a lessening of the clamping pressure. It must be borne in mind that, while there is a radial pressure on the sidewalls of the hose, this same pressure is exerted in a longitudinal direction and tends to lengthen the hose and to pull the enlarged end of the hose through the opening in the clamping ring 21. It is, therefore, necessary to form the hose flange in such a manner as to make it practically impossible for the parts of the hose to change their initial positions with respect to each other.

A round section is used for the ring 15 to permit of a gradual change in the angle of the wire wrapped therearound, rather than to have a ring which is angular in cross-section, in which case the wire takes a bend and is thus weakened. Obviously, the ring need not be of circular cross-section to accomplish this result, as it could be made slightly oval or with the right-hand side thereof, as illustrated in Fig. 1, arcuate in form and with the other side thereof tapered or shaped so as not to interfere with the wires or fabric occupying the relative positions illustrated in the drawings.

When the clamping pressure is exerted on the hose in an endwise direction by bolts passing through the bores 23 thereof, there is a radial force exerted on the ring 15, which tends to move the sections inwardly toward each other. This force is resisted by the rubber and fabric forming the body of the hose. Thus, even if the clamping pressure on the flange is lessened, as by loosening of the bolts, there is still a firm non-leaking connection formed for the reason that the ring is caused to expand outwardly and become slightly larger in diameter whereby the ends 22 of the hose are kept in firm engagement with each other.

Obviously, those skilled in the art to which this invention pertains may make various changes in the particular arrangement and construction of the hose without departing from the spirit of this invention and, therefore, I do not wish to be limited except as may be hereinafter set forth in the claims.

Having thus fully described my invention, what I claim and desire to secure by Letters Patent of the United States is:

1. A flanged end hose including a rubber and fabric body, a circumferentially split metal ring positioned adjacent the end of the body with the end of the body being cuffed back over the ring, the ends of the ring normally being spaced apart by the resiliency of the body, and clamping means surrounding the body and engaging with the cuffed back end thereof adjacent the ring and adapted to compress the body and move the ends of the ring towards each other during a clamping operation.

2. A hose comprising a tubular body, a flange on said body extending outwardly therefrom, a transversely split reinforcing ring embedded in said flanged end and covered on all sides by the material of said flange, said ring having interfitting guide elements to guide the sections of said ring to and from each other and normally in spaced relation at their mating ends to leave a gap therebetween, and fabric encircling the opposed ends of said ring to restrict partially the flow of the surrounding flange material into the space between said ends.

3. A flanged end hose including a rubber and fabric body, a circumferentially split metal ring positioned adjacent the end of the body with the end of the body being cuffed back over the ring, the ends of the ring normally being resiliently and yieldably spaced apart, and an inextensible metal clamping means surrounding the body and engaging with the cuffed back end thereof adjacent the ring and adapted to move the ends of the ring towards each other during a clamping operation.

DONALD E. HARPFER.